(12) United States Patent
Xin et al.

(10) Patent No.: US 11,962,451 B2
(45) Date of Patent: Apr. 16, 2024

(54) MODULATION SCHEME FOR LOW PEAK AVERAGE POWER RATIO (PAPR)

(71) Applicant: ZTE Corporation, Guangdong (CN)

(72) Inventors: Yu Xin, Guangdong (CN); Guanghui Yu, Guangdong (CN); Jian Hua, Guangdong (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 17/687,133

(22) Filed: Mar. 4, 2022

(65) Prior Publication Data

US 2022/0255784 A1    Aug. 11, 2022

Related U.S. Application Data

(63) Continuation of application No. PCT/CN2019/104500, filed on Sep. 5, 2019.

(51) Int. Cl.
*H04L 27/26* (2006.01)
*H04L 27/20* (2006.01)
(Continued)

(52) U.S. Cl.
CPC .......... *H04L 27/2614* (2013.01); *H04L 27/20* (2013.01); *H04L 27/22* (2013.01); *H04L 27/3411* (2013.01)

(58) Field of Classification Search
CPC ............. H04L 27/2614; H04L 27/2626; H04L 27/2627; H04L 27/20; H04L 27/22;
(Continued)

(56) References Cited

U.S. PATENT DOCUMENTS 6,954,505 B2    10/2005    Gatherer et al.
8,432,996 B2 *  4/2013    Watanabe ........... H04L 27/2626
                                                    375/295
(Continued)

FOREIGN PATENT DOCUMENTS

CN    108667561 A    10/2018
JP    2002-314502 A  10/2002
(Continued)

OTHER PUBLICATIONS

Chinese office action issued in CN Patent Application No. 201980102064.3, dated Apr. 19, 2023, 10 pages. English translation included.

(Continued)

*Primary Examiner* — Betsy Deppe
(74) *Attorney, Agent, or Firm* — Perkins Coie LLP

(57) ABSTRACT

Methods, apparatus, and systems for reducing Peak Average Power Ratio (PAPR) in signal transmissions are described. In one example aspect, a wireless communication method includes determining, for an input sequence of coefficients, an output sequence and generating a waveform using the output sequence. The output sequence corresponds to an output of a convolutional modulation between a three-coefficient function associated with $$\frac{\sqrt{2}}{2},$$

(Continued)

1, and $$\frac{\sqrt{2}}{2}$$

and an intermediate sequence. The intermediate sequence is generated by inserting zero coefficients between coefficients of the input sequence of coefficients.

17 Claims, 5 Drawing Sheets

(51) Int. Cl.
  *H04L 27/22* (2006.01)
  *H04L 27/34* (2006.01)
(58) Field of Classification Search
  CPC ......... H04L 27/18; H04L 27/36; H04L 27/38; H04L 27/34; H04L 27/3411
  See application file for complete search history.

(56) References Cited

U.S. PATENT DOCUMENTS

| | | | |
|---|---|---|---|
| 9,544,173 | B1 | 1/2017 | Berardinelli et al. |
| 2001/0055320 | A1 | 12/2001 | Pierzga et al. |
| 2014/0029511 | A1 | 1/2014 | Park et al. |
| 2017/0201403 | A1 | 7/2017 | Johansson et al. |
| 2018/0324005 | A1* | 11/2018 | Kim ................... H04L 27/2614 |
| 2019/0052486 | A1 | 2/2019 | Kuchi |

FOREIGN PATENT DOCUMENTS

| | | |
|---|---|---|
| JP | 2007-325072 A | 12/2007 |
| WO | 2012115453 A2 | 8/2012 |
| WO | 2019042532 A1 | 3/2019 |

OTHER PUBLICATIONS

International Search Report and Written Opinion dated Jun. 4, 2020 for International Application No. PCT/CN2019/104500, filed on Sep. 5, 2019 (6 pages).
ZTE, "Updated offline summary of transmitter side signal processing schemes for NOMA," 3GPP TSG RAN WG1 Meeting #94, R1-1809974, Gothenburg, Sweden, Aug. 20-24, 2018, 23 pages.
European Search Report for EP Patent Application No. 19944523.0, dated Nov. 8, 2022, 13 pages.
Japanese office action issued in JP Patent Application No. 2022-515055, dated Jul. 27, 2023, 6 pages. English translation included.
Chinese Notification to Complete Formalities of Registration issued in CN Patent Application No. 201980102064.3, dated Oct. 7, 2023, 4 pages. English translation included.
Japanese office action issued in JP Patent Application No. 2022-515055, dated Jan. 12, 2024, 4 pages. English translation included.

* cited by examiner

MODULATION SCHEME FOR LOW PEAK AVERAGE POWER RATIO (PAPR)

CROSS-REFERENCE TO RELATED APPLICATIONS

This application is a continuation of International Patent Application No. PCT/CN2019/104500, filed on Sep. 5, 2019, the contents of which are incorporated herein by reference in their entirety.

TECHNICAL FIELD

This patent document is directed generally to wireless communications.

BACKGROUND

Mobile communication technologies are moving the world toward an increasingly connected and networked society. The rapid growth of mobile communications and advances in technology have led to greater demand for capacity and connectivity. Other aspects, such as energy consumption, device cost, spectral efficiency, and latency are also important to meeting the needs of various communication scenarios. Various techniques, including new ways to provide higher quality of service, longer battery life, and improved performance are being discussed.

SUMMARY

This patent document describes, among other things, techniques for reducing Peak Average Power Ratio (PAPR) in signal transmissions.

In one example aspect, a wireless communication method is disclosed. The method includes determining, for an input sequence of coefficients, an output sequence and generating a waveform using the output sequence. The output sequence corresponds to an output of a convolutional modulation between a three-coefficient function associated with $$\frac{\sqrt{2}}{2},$$

1, and $$\frac{\sqrt{2}}{2}$$

and an intermediate sequence. The intermediate sequence is generated by inserting zero coefficients between coefficients of the input sequence of coefficients.

In another example aspect, a wireless communication method includes receiving a sequence generated by a convolutional modulation between a three-coefficient function associated with $$\frac{\sqrt{2}}{2},$$

1, and $$\frac{\sqrt{2}}{2}$$

and an intermediate sequence and demodulating the sequence to determine the input sequence. The intermediate sequence is generated by inserting multiple zeros coefficients between coefficients of an input sequence of coefficients.

The following examples list techniques preferably implemented by some embodiments. In some embodiments, the zero coefficients are inserted before each coefficient of the input sequence. In some embodiments, the zero coefficients are inserted after each coefficient of the input sequence. In some embodiments, the convolutional modulation includes a circular modulation or a linear modulation. In some embodiments, the convolutional modulation comprises a multi-path delay operation. The multi-path delay operation can include a circular delay in which coefficients in the intermediate sequence are shifted in time domain in a circular manner or a linear delay in which coefficients in the intermediate sequence are shifted in time domain in a linear manner. In some embodiments, the multi-path delay operation comprises generating multiple delayed sequences based on the intermediate sequence using different delay values; and computing a weighted sum of the multiple delayed sequences using the three-coefficient function. In some embodiments, the multi-path delay operation generates three delayed paths, and wherein $$\frac{\sqrt{2}}{2},$$

1, and $$\frac{\sqrt{2}}{2}$$

are coefficients for the corresponding delayed paths.

In some embodiments, the input sequence of coefficients is determined by mapping data bits to constellation points according to a modulation scheme. In some embodiments, the modulation scheme includes π/2-Binary Phase Shift Keying (BPSK). In some embodiments, the input sequence includes a data sequence or a reference sequence. In some embodiments, the input sequence includes one or more zero coefficients.

In another example aspect, a communication apparatus is disclosed. The apparatus includes a processor that is configured to implement an above-described method.

In yet another example aspect, a computer-program storage medium is disclosed. The computer-program storage medium includes code stored thereon. The code, when executed by a processor, causes the processor to implement a described method.

These, and other, aspects are described in the present document.

DETAILED DESCRIPTION

Section headings are used in the present document only to improve readability and do not limit scope of the disclosed embodiments and techniques in each section to only that section. Certain features are described using the example of 5G wireless protocol. However, applicability of the disclosed techniques is not limited to only 5G wireless systems.

In high-frequency wireless communication scenarios, path loss and shadow attenuation are relatively large. Thus, the signal-to-noise ratio in some areas at the edge of the cell is low. Moreover, the efficiency of the power amplifier (PA) is relatively low at high frequencies. To improve the signal to interference and noise ratio (SINR) and also save power consumption of the User Equipment (UE), it is desirable to have the UE transmit signals at the lower Peak Average Power Ratio (PAPR).

Furthermore, terminal devices may want to greatly reduce power consumption in the case of massive Machine Type Communication (mMTC). For example, in some scenarios, it is desirable to have a long battery life (e.g., of more than ten years) to reduce the need of dispatching maintenance team to replace batteries. To improve the PA efficiency of such terminal devices, the transmitted signals should be with the lower PAPR. In particular, when a large number of user devices gain non-orthogonal access, the SINR is very low. There exists a need to use a low modulation and coding scheme (MCS) and low PAPR signal modulation to improve the transmission quality.

In the current Fifth-Generation (5G) New Radio (NR) standard, although the peak-to-average ratio of DFT-s-OFDM signals is relatively low, it is still difficult to meet low PAPR requirements of various application scenarios of B5G or 6G. This patent document describes techniques that can be implemented in various embodiments to use a modulation scheme that further reduces PAPR.

Figure 1:
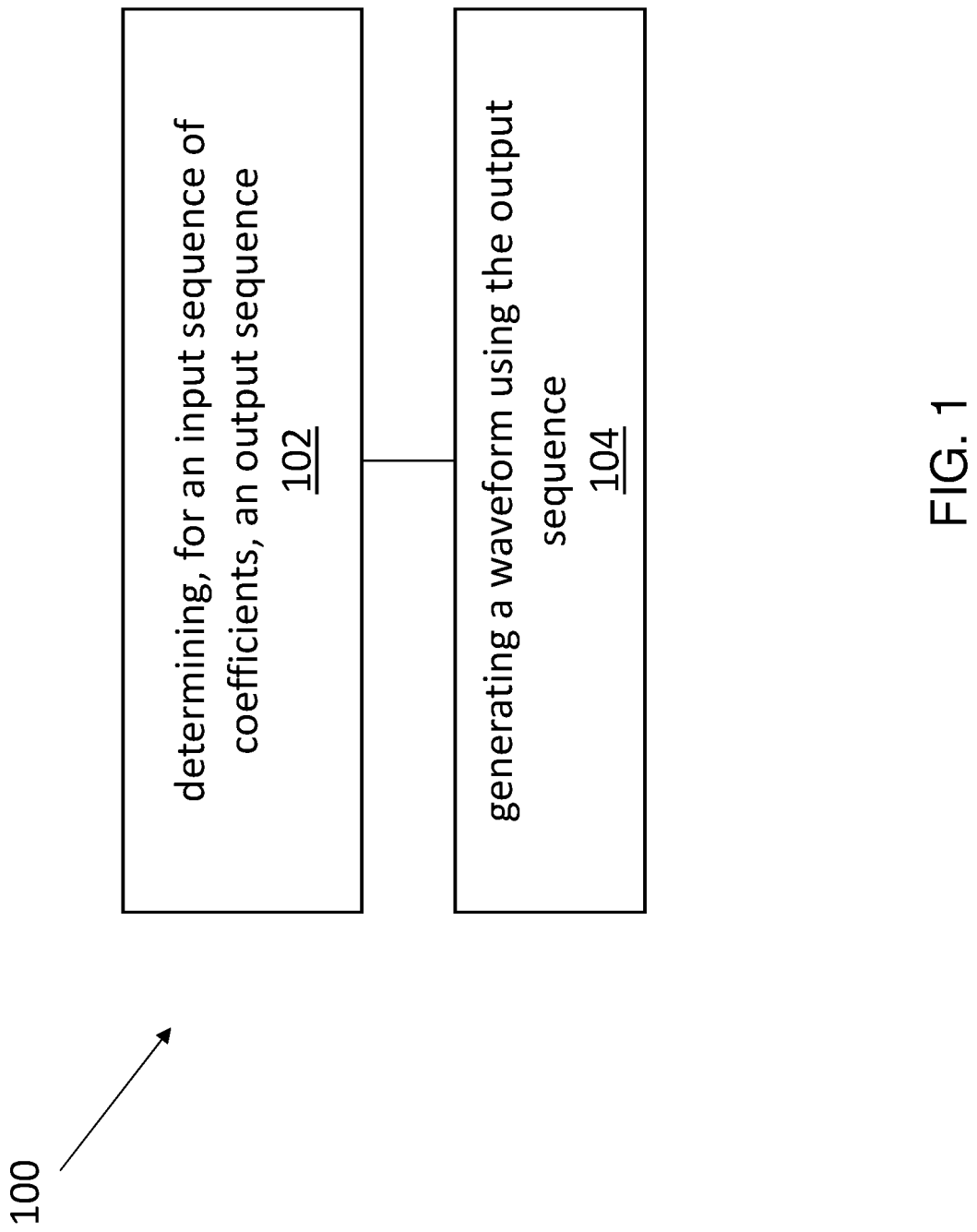
FIG. 1 is a flowchart representation of a wireless communication method in accordance with the present technology.

FIG. 1 is a flowchart representation of a wireless communication method 100 in accordance with the present technology. The method 100 includes, at operation 102, determining, for an input sequence of coefficients, an output sequence. The output sequence corresponds to an output of a convolutional modulation between a three-coefficient function and an intermediate sequence. For example, the three-coefficient function is associated with $$\frac{\sqrt{2}}{2},$$

1, and $$\frac{\sqrt{2}}{2}$$

to achieve desired phase and modulus for lower PAPR. The intermediate sequence is generated by inserting zero coefficients between coefficients of the input sequence of coefficients. The method 100 also includes, at operation 104, generating a waveform using the output sequence.

Figure 2:
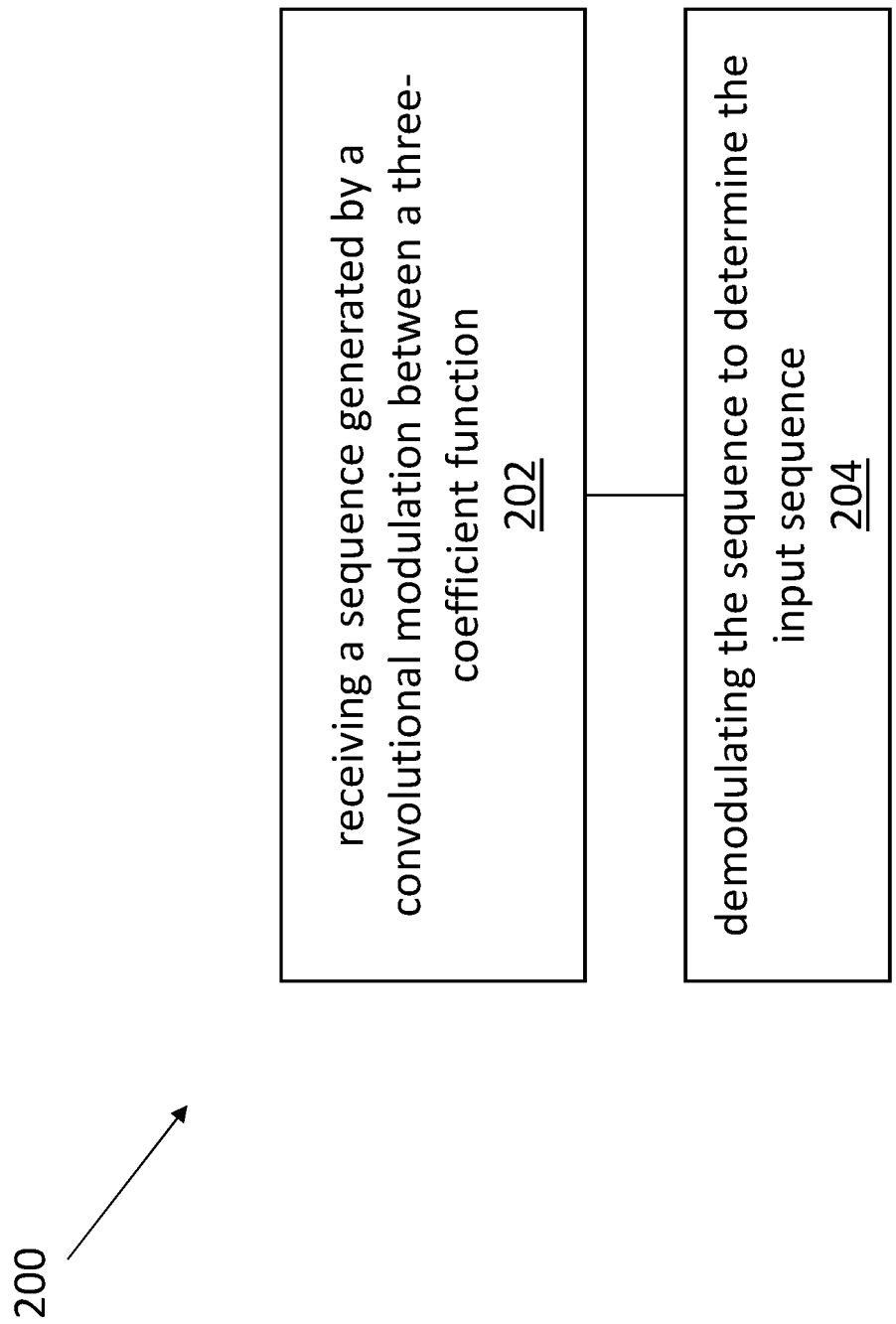
FIG. 2 is a flowchart representation of another wireless communication method in accordance with the present technology.

FIG. 2 is a flowchart representation of another wireless communication method 200 in accordance with the present technology. The method 200 includes, at operation 202, receiving a sequence generated by a convolutional modulation between a three-coefficient function and an intermediate sequence. The three-coefficient function can be associated with $$\frac{\sqrt{2}}{2},$$

1, and $$\frac{\sqrt{2}}{2}$$

to achieve desired phase and modulus for lower PAPR. The intermediate sequence is generated by inserting multiple zeros coefficients between coefficients of an input sequence of coefficients. The method 200 includes, at operation 204, demodulating the sequence to determine the input sequence.

In some embodiments, the above described methods may preferably further include one or more of the following features. In some embodiments, the zero coefficients are inserted before each coefficient of the input sequence. In some embodiments, the zero coefficients are inserted after each coefficient of the input sequence. The convolutional modulation can include a circular modulation or a linear modulation. In some embodiments, the convolutional modulation comprises a multi-path delay operation. The multi-path delay operation includes a circular delay in which coefficients in the intermediate sequence are shifted in time domain in a circular manner or a linear delay in which coefficients in the intermediate sequence are shifted in time domain in a linear manner. In some embodiments, the multi-path delay operation includes generating multiple delayed sequences based on the intermediate sequence using different delay values and computing a weighted sum of the multiple delayed sequences using the three-coefficient function. For example, the multi-path delay operation generates three delayed sequences, and $$\frac{\sqrt{2}}{2},$$

1, and $$\frac{\sqrt{2}}{2}$$

are coefficients for the corresponding delayed sequences.

The advantage of inserting zero coefficients between coefficients of the input sequence is that the zero coefficients can facilitate the multipath delay operation so that the data with a path difference of two steps is not affected by the weighted sum of the multiple paths. For example, given three paths (or sequences) $D^{-1}$, $D^0$, and $D^{-1}$, data in path $D^0$ does not impact data in path $D^{-1}$ and $D^1$. Assume that the coefficient for path $D^{-1}$ is d(−1), the coefficient for path $D^0$ is d(0) and the coefficient for path $D^1$ is d(1). In some embodiments, d(0)=1 so that there is no impact on data for path $D^0$. In some embodiments, $$d(-1) = d(1) = \frac{\sqrt{2}}{2}$$

so that, after the multipath delay operation, the phase obtained by superimposing $D^{-1}$ and $D^1$ is between the phases of two adjacent elements, thereby reducing PAPR.

Moreover, after receiving the data that includes the data sequence [s(k)], the receiving end obtains the data including the data sequence [x(i)] by using a correlation detection algorithm such as maximum ratio combining, which adds minimum added complexity to the receiving side. The data sequence [x(i)] does not cause error propagation between data elements during demodulation. In addition, although the length of [s(k)] is doubled the length of [x(i)], which requires more physical resources, the improvement of signal-to-noise ratio (SNR) (e.g., experiments have shown that SNR can be improved by 3 dB) can compensate for the loss of transmission efficiency.

When the modulation scheme of π/2-BPSK is combined with the path coefficients, after superimposing data of paths $D^{-1}$ and $D^1$, the resulting modulus value is equal to the modulus of path $D^0$. Thus, the modulus values of all the element data of the data sequence [s(k)] are equal, and the phase difference between adjacent elements is relatively small, thereby reducing the PAPR of the data sequence [s(k)]. It is noted that while the application focuses on path coefficients of $$\frac{\sqrt{2}}{2},$$

1, and $$\frac{\sqrt{2}}{2},$$

other coefficients and corresponding modulation scheme that can achieve equal modulus values and small phase difference between adjacent elements can also be used to achieve low PAPR.

Moreover, after receiving the data that includes the data sequence [s(k)], the receiving end obtains the data including the data sequence [x(i)] by using a correlation detection algorithm such as maximum ratio combining, which adds minimum added complexity to the receiving side. The data sequence [x(i)] does not cause error propagation between data elements during demodulation. In addition, although the length of [s(k)] is doubled than the length of [x(i)], which requires more physical resources, the improvement of signal-to-noise ratio (SNR) (e.g., experiments have shown that SNR can be improved by 3 dB) can compensate for the loss of transmission efficiency.

Some examples of the disclosed techniques are described in the following example embodiments.

Embodiment 1

The input data sequence is [x(i)]=[x(1), x(2), . . . , x(I)]. Zero coefficients are inserted after each element to form a second data sequence [y(j)]=[x(1), 0, x(2), 0, . . . , x(I), 0]. Accordingly, y(1)=x(1), y(2)=0, y(3)=x(2), y(4)=0, . . . , and J=2I. Then, the second data sequence [y(j)] undergoes a multipath delay operation with a delay length of $$\frac{\sqrt{2}}{2} D^{-1} + D^0 + \frac{\sqrt{2}}{2} D^1.$$

In this embodiment, the multipath delay operation is a multipath cyclic delay operation that includes the following steps:

(1) In a first path, the data sequence [y(j)] undergoes a cyclic delay with a delay value of −1. The resulting data sequence is: [0, x(2), 0, . . . , x(I), 0, x(1)]x $$\frac{\sqrt{2}}{2}.$$

Note that element x(1) is shifted to the end of the sequence due the cyclic or circular nature of the delay operation.

(2) In a second path, the data sequence [y(j)] undergoes a cyclic delay with a delay value of 0. Because the delay value is 0, the data sequence of this path remains as [y(j)]. The resulting data sequence is: [x(1), 0, x(2), 0, . . . , x(I), 0].

(3) In a third path, the data sequence [y(j)] undergoes a cyclic delay with a delay value of 1. The resulting data sequence is: [0, x(1), 0, x(2), 0, . . . , x(I)]x $$\frac{\sqrt{2}}{2}.$$

After adding the data sequences obtained by the three paths in (1), (2) and (3), the data sequence [s(k)] is obtained as follows:

$$[s(k)] = \begin{bmatrix} x(1), \frac{\sqrt{2}}{2}(x(2)+x(1)), x(2), \frac{\sqrt{2}}{2}(x(3)+x(2)), \\ x(3), \ldots, x(I), \frac{\sqrt{2}}{2}(x(1)+x(I)) \end{bmatrix}$$

Therefore, $$s(1) = x(1), s(2) = \frac{\sqrt{2}}{2}(x(2)+x(1)), s(3) = x(2),$$

$$\ldots, s(K) = \frac{\sqrt{2}}{2}(x(1)+x(I)) \text{ and } K = J = 2I.$$

The data sequence [s(k)] is carried on the physical time-frequency resource for transmission. When transmitting on physical time-frequency resources, it is also possible to discard some of the s(K) elements in order to save resources.

Embodiment 2

The input data sequence is [x(i)]=[x(1), x(2), . . . , x(I)]. Zero coefficients are inserted before each element to form a second data sequence [y(j)]=[0, x(1), 0, x(2), 0, . . . , x(I)]. Accordingly, y(1)=0, y(2)=x(1), (3)=0, y(4)=x(2) and J=2I. Then, the second data sequence [y(j)] undergoes a multipath delay operation with a delay length of $$\frac{\sqrt{2}}{2}D^{-1} + D^0 + \frac{\sqrt{2}}{2}D^1.$$

In this embodiment, the multipath delay operation is a multipath cyclic delay operation that includes the following steps:

(1) In a first path, the data sequence [y(j)] undergoes a cyclic delay with a delay value of −1. The resulting data sequence is: [x(1), 0, x(2), 0, . . . , x(I), 0]x $$\frac{\sqrt{2}}{2}.$$

(2) In a second path, the data sequence [y(j)] undergoes a cyclic delay with a delay value of 0. Because the delay value is 0, the data sequence of this path remains as [y(j)]. The resulting data sequence is: [0, x(1), 0, x(2), 0, . . . , x(I)].

(3) In a third path, the data sequence [y(j)] undergoes a cyclic delay with a delay value of 1. The resulting data sequence is: [x(I), 0, x(1), 0, x(2), 0, . . . , x(I−1), 0]x $$\frac{\sqrt{2}}{2}.$$

Note that element x(I) is shifted to the beginning of the sequence due the cyclic or circular nature of the delay operation.

After adding the data sequences obtained by the three paths in (1), (2) and (3), the data sequence [s(k)] is obtained as follows:

$$[s(k)] = \begin{bmatrix} \frac{\sqrt{2}}{2}(x(1)+x(I)), x(1), \frac{\sqrt{2}}{2}(x(2)+x(1)), x(2), \\ \frac{\sqrt{2}}{2}(x(3)+x(2)), x(3), \ldots, x(I) \end{bmatrix}$$

Therefore, $$s(1) = \frac{\sqrt{2}}{2}(x(1)+x(I)), s(2) = x(1),$$

$$s(3) = \frac{\sqrt{2}}{2}(x(2)+x(1)), \ldots, s(K) = x(I)) \text{ and } K = J = 2I.$$

The data sequence [s(k)] is carried on the physical time-frequency resource for transmission. When transmitting on physical time-frequency resources, it is also possible to discard some of the s(K) elements in order to save resources.

Embodiment 3

The input data sequence is [x(i)]=[x(1), x(2), . . . , x(I)]. Zero coefficients are inserted after each element to form a second data sequence [y(j)]=[x(1), 0, x(2), 0, . . . , x(I), 0]. Accordingly, y(1)=x(1), y(2)=0, y(3)=x(2), y(4)=0, . . . , and J=2I. Then, the second data sequence [y(j)] undergoes a multipath delay operation with a delay length of $$\frac{\sqrt{2}}{2}D^{-1} + D^0 + \frac{\sqrt{2}}{2}D^1.$$

In this embodiment, the multipath delay operation is a multipath linear delay operation that includes the following steps:

(1) In a first path, the data sequence [y(j)] undergoes a linear delay with a delay value of −1. The resulting data sequence is: [x(1), 0, x(2), 0, . . . , x(I), 0]x $$\frac{\sqrt{2}}{2}.$$

Note that first element x(1) is shifted linearly to time-domain position t=−1 due the linear nature of the delay operation.

(2) In a second path, the data sequence [y(j)] undergoes a linear delay with a delay value of 0. Because the delay value is 0, the data sequence of this path remains as [y(j)]. The resulting data sequence is: [0, x(1), 0, x(2), 0, . . . , x(I), 0]. Note that although there is no change to [y(j)], a leading zero is added to the sequence so that the second sequence can align with the first sequence starting from time-domain position t=−1.

(3) In a third path, the data sequence [y(j)] undergoes a linear delay with a delay value of 1. The resulting data sequence is: [0, 0, x(1), 0, x(2), 0, . . . , x(I), 0]x $$\frac{\sqrt{2}}{2}.$$

Note that although the third path undergoes only a delay value of 1, two leading zeros are added to the sequence so that the third sequence can align with the other two sequences starting from time-domain position t=−1.

After adding the data sequences obtained by the three paths in (1), (2) and (3), the data sequence [s(k)] is obtained as follows:

$$[s(k)] = \begin{bmatrix} \frac{\sqrt{2}}{2}x(1), x(1), \frac{\sqrt{2}}{2}(x(2)+x(1)), x(2), \frac{\sqrt{2}}{2} \\ (x(3)+x(2)), x(3), \ldots, x(I), \frac{\sqrt{2}}{2}x(I), 0 \end{bmatrix}$$

Therefore, $$s(1) = \frac{\sqrt{2}}{2}x(1), s(2) = x(1), s(3) = \frac{\sqrt{2}}{2}(x(2)+x(1)),$$

$$s(4) = x(2), \ldots, s(K-1) = \frac{\sqrt{2}}{2}x(I), S(K) = 0 \text{ and } K > J = 2I.$$

The data sequence [s(k)] is carried on the physical time-frequency resource for transmission. When transmitting on the physical time-frequency resource, the first data element s(1) is superimposed and transmitted with the previous data block, and the last data element s(K) is superimposed and transmitted with the latter data block.

Embodiment 4

The input data sequence is [x(i)]=[x(1), x(2), ..., x(I)]. Zero coefficients are inserted before each element to form a second data sequence [y(j)]=[0, x(1), 0, x(2), 0, ..., x(I)]. Accordingly, y(1)=0, y(2)=x(1), y(3)=0, y(4)=x(2), ... and J=2I. Then, the second data sequence [y(j)] undergoes a multipath delay operation with a delay length of $$\frac{\sqrt{2}}{2}D^{-1} + D^0 + \frac{\sqrt{2}}{2}D^1.$$

In this embodiment, the multipath delay operation is a multipath linear delay operation that includes the following steps:

(1) In a first path, the data sequence [y(j)] undergoes a linear delay with a delay value of −1. The resulting data sequence is: [0, x(1), 0, x(2), 0, ..., x(I)]. Note that first element 0 is shifted to linearly to time-domain position t=−1 due the linear nature of the delay operation.

(2) In the second path, the data sequence [y(j)] undergoes a linear delay with a delay value of 0. Because the delay value is 0, the data sequence of this path remains as [y(j)]. The resulting data sequence is: [0, 0, x(1), 0, x(2), 0, ..., x(I), 0]. Note that although there is no change to [y(j)], a leading zero is added to the sequence so that the second sequence can align with the first sequence starting from time-domain position t=−1.

(3) In a third path, the data sequence [y(j)] undergoes a linear delay with a delay value of 1. The resulting data sequence is: [0, 0, 0, x(1), 0, x(2), 0, ..., x(I)]×

$$\frac{\sqrt{2}}{2}.$$

Note that although the third path undergoes only a delay value of 1, two leading zeros are added to the sequence so that the third sequence can align with the other two sequences starting from time-domain position t=−1.

After adding the data sequences obtained by the three paths in (1), (2) and (3), the data sequence [s(k)] is obtained as follows:

$$[s(k)] = \begin{bmatrix} 0, \frac{\sqrt{2}}{2}x(1), x(1), \frac{\sqrt{2}}{2}(x(2)+x(1)), \\ x(2), \frac{\sqrt{2}}{2}(x(3)+x(2)), x(3), \ldots, x(I), \frac{\sqrt{2}}{2}x(I) \end{bmatrix}$$

Therefore, $$s(1) = 0, s(2) = \frac{\sqrt{2}}{2}x(1), s(3) = x(1), s(4) = \frac{\sqrt{2}}{2}(x(2)+x(1)),$$

$$\ldots, s(K) = \frac{\sqrt{2}}{2}x(I) \text{ and } K > J = 2I.$$

The data sequence [s(k)] is carried on the physical time-frequency resource for transmission. When transmitting on the physical time-frequency resource, the first data element s(1) is superimposed and transmitted with the previous data block, and the last data element s(K) is superimposed and transmitted with the latter data block.

Embodiment 5

Figure 3:
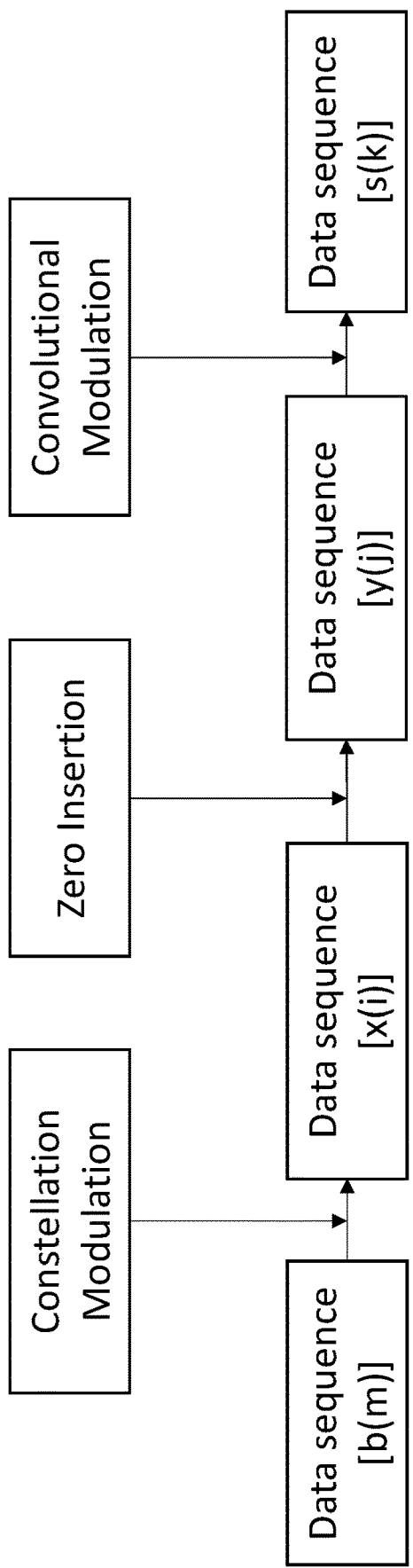
FIG. 3 illustrates example sequence of operations in accordance with the present technology.

FIG. 3 illustrates example sequence of operations in accordance with the present technology. The user data sequence [b(m)] to be transmitted is first modulated by constellation points to generate a data sequence [x(i)]. The constellation modulation includes π/2-BPSK, π/4-QPSK, QPSK, 16QAM, and/or APSK. Zero coefficients are then inserted into the data sequence [x(i)] to generate data sequence [y(j)]. The zero coefficients can be inserted before or after each element of the data sequence [x(i)]. The resulting data sequence [y(j)] is then convolutionally modulated to generate a data sequence [s(k)]. The convolution modulation includes a circular convolution, a linear convolution, a cyclic delay operation, or a linear delay operation.

Embodiment 6

When the convolution modulation in FIG. 3 is circular convolution modulation, the cyclic convolution modulation includes a circular convolution of the data sequence [y(j)] and data sequence [d(−1), d(0), d(1)]. The values of [d(−1), d(0), d(1)] are selected so that the phase differences between adjacent elements in the resulting sequence is relatively small. In some embodiments, d(−1)=d(1). For example, $$d(-1) = d(1) = \frac{\sqrt{2}}{2},$$

d(0)=1. It is noted that the circular convolution of the data sequence [y(j)] and data sequence [d(−1), d(0), d(1)] is equivalent to a circular convolution of the data sequence [y(j)] and data sequence [d(v)], in which $$d(V-1) = d(1) = \frac{\sqrt{2}}{2}, d(0) = 1,$$

and d(v)=0 for v=the other values. v=0, 1, 2, ..., V−1 and J=V.

When the convolution modulation in FIG. 3 is a linear convolution modulation, the linear convolution modulation includes a linear convolution of the data sequence [y(j)] and data sequence [d(−1), d(0), d(1)]. Similarly, The values of [d(−1), d(0), d(1)] are selected so that the phase differences between adjacent elements in the resulting sequence is relatively small. In some embodiments, d(−1)=d(1). For example, $$d(-1) = d(1) = \frac{\sqrt{2}}{2}, d(0) = 1.$$

In some embodiments, other operations can be performed before the data sequence [s(k)] is carried on a physical time-frequency resource for transmission, such as adding a reference sequence in the data sequence [s(k)], adding a reference sequence before or after the data sequence [s(k)], performing Fast Fourier Transform (FFT), performing frequency shaping, performing Inverse FFT (IFFT), and/or filtering of the data sequence [s(k)].

Figure 4:
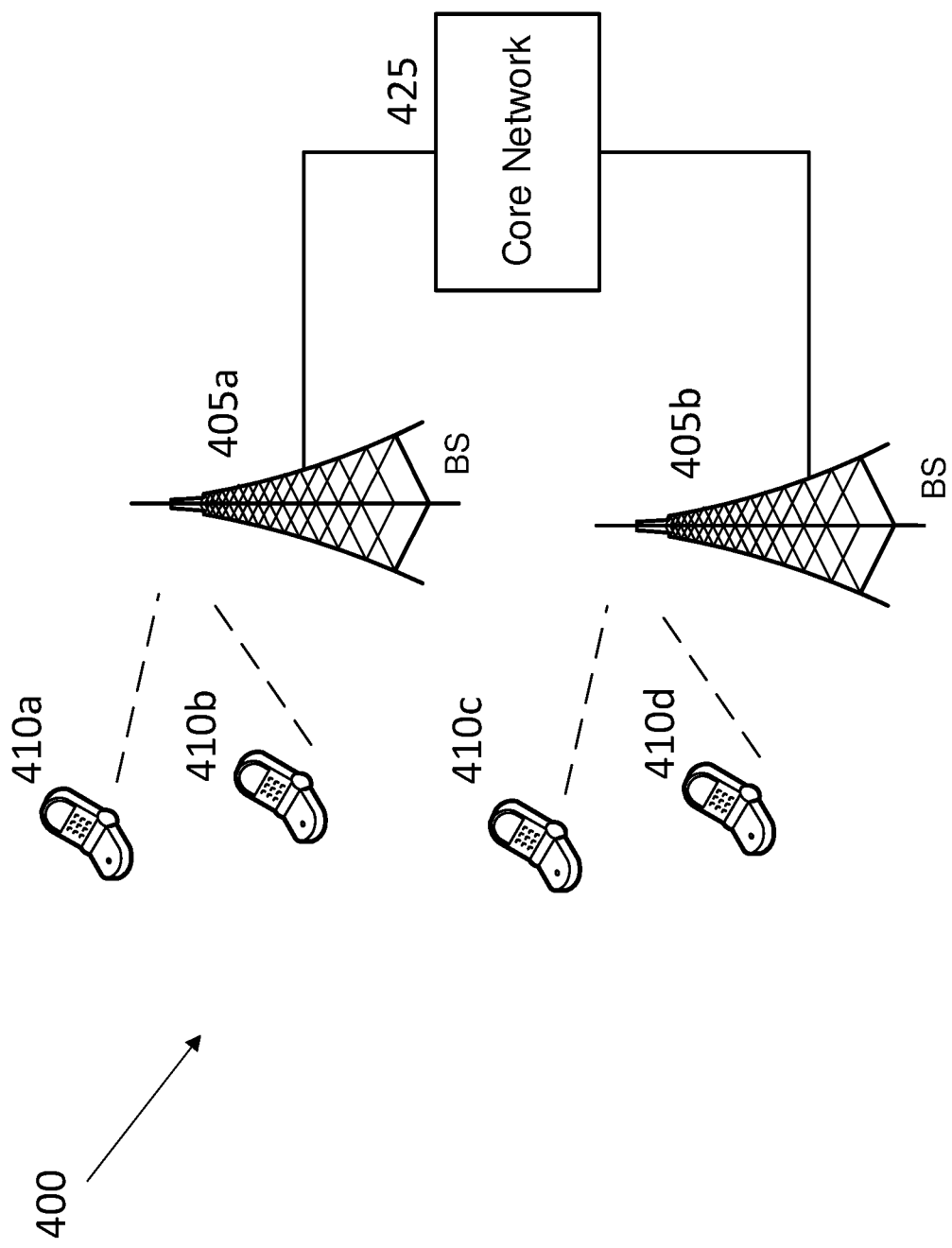
FIG. 4 shows an example of a wireless communication system where techniques in accordance with one or more embodiments of the present technology can be applied.

FIG. 4 shows an example of a wireless communication system 400 where techniques in accordance with one or more embodiments of the present technology can be applied. A wireless communication system 400 can include one or more base stations (BSs) 405a, 405b, one or more wireless devices 410a, 410b, 410c, 410d, and a core network 425. A base station 405a, 405b can provide wireless service to wireless devices 410a, 410b, 410c and 410d in one or more wireless sectors. In some implementations, a base station 405a, 405b includes directional antennas to produce two or more directional beams to provide wireless coverage in different sectors.

The core network 425 can communicate with one or more base stations 405a, 405b. The core network 425 provides connectivity with other wireless communication systems and wired communication systems. The core network may include one or more service subscription databases to store information related to the subscribed wireless devices 410a, 410b, 410c, and 410d. A first base station 405a can provide wireless service based on a first radio access technology, whereas a second base station 405b can provide wireless service based on a second radio access technology. The base stations 405a and 405b may be co-located or may be separately installed in the field according to the deployment scenario. The wireless devices 410a, 410b, 410c, and 410d can support multiple different radio access technologies.

Figure 5:
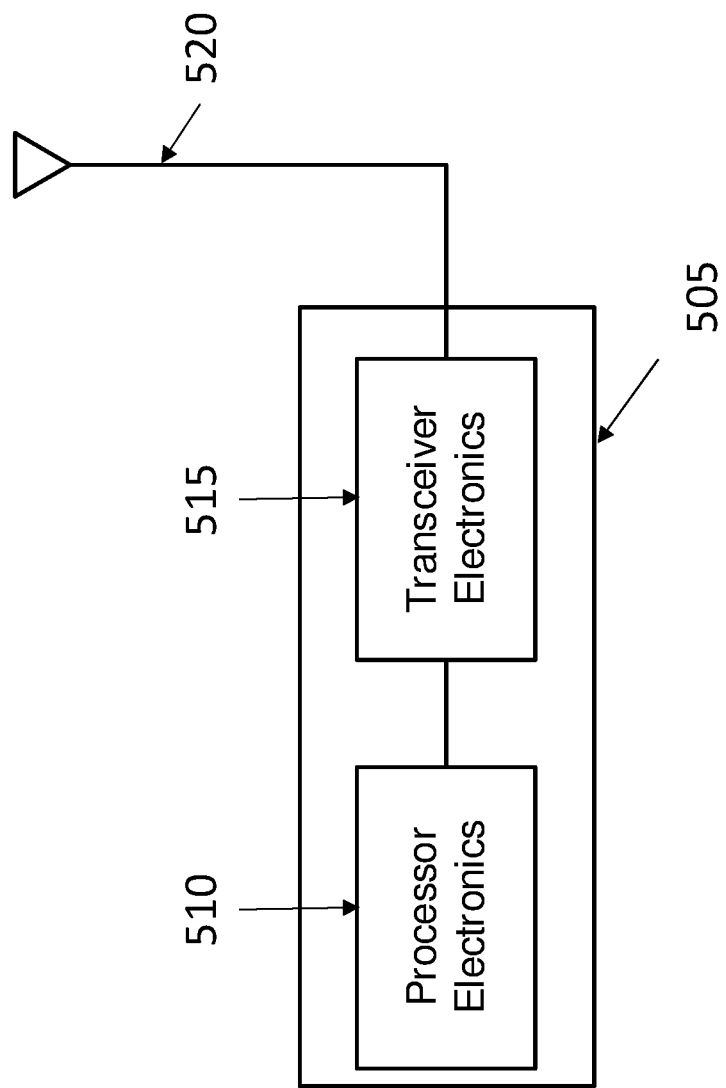
FIG. 5 is a block diagram representation of a portion of a radio station in accordance with one or more embodiments of the present technology can be applied.

FIG. 5 is a block diagram representation of a portion of a radio station in accordance with one or more embodiments of the present technology can be applied. A radio station 505 such as a base station or a wireless device (or UE) can include processor electronics 510 such as a microprocessor that implements one or more of the wireless techniques presented in this document. The radio station 505 can include transceiver electronics 515 to send and/or receive wireless signals over one or more communication interfaces such as antenna 520. The radio station 505 can include other communication interfaces for transmitting and receiving data. Radio station 505 can include one or more memories (not explicitly shown) configured to store information such as data and/or instructions. In some implementations, the processor electronics 510 can include at least a portion of the transceiver electronics 515. In some embodiments, at least some of the disclosed techniques, modules or functions are implemented using the radio station 505.

It will be appreciated that the present document discloses techniques that can be embodied in various embodiments to efficiently reduce PAPR in signal transmission, thereby meeting the low PAPR requirements of various wireless communication applications. The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read-only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described, and other implementations, enhancements and variations can be made based on what is described and illustrated in this patent document.

What is claimed is:

1. A method for wireless communication, comprising:
   determining, for an input sequence of coefficients that is generated by mapping data bits to constellation points according to a π/2-Binary Phase Shift Keying (BPSK) modulation scheme, an output sequence; and
   generating a waveform using the output sequence;
   wherein the output sequence corresponds to an output of a convolutional modulation between a three-coefficient function having values $$\frac{\sqrt{2}}{2},$$

1, and $$\frac{\sqrt{2}}{2}$$

and an intermediate sequence,
   wherein the intermediate sequence is generated by inserting a zero coefficient between each pair of adjacent coefficients of the input sequence,
   wherein the convolutional modulation comprises a multi-path delay operation, and wherein the multi-path delay operation comprises:
   generating multiple delayed sequences based on the intermediate sequence using different delay values; and
   computing a weighted sum of the multiple delayed sequences using the three-coefficient function.

2. The method of claim 1, wherein an additional zero coefficient is inserted before a first coefficient of the input sequence.

3. The method of claim 1, wherein generating the multiple delayed sequences includes a cyclic delay operation in which coefficients in the intermediate sequence are shifted in time domain in a circular manner or a linear delay operation in which coefficients in the intermediate sequence are shifted in time domain in a linear manner.

4. The method of claim 1, wherein the multi-path delay operation generates three delayed sequences, and wherein $$\frac{\sqrt{2}}{2},$$

1, and $$\frac{\sqrt{2}}{2}$$

are coefficients for the corresponding delayed sequences.

5. The method of claim 1, wherein the input sequence includes a reference sequence.

6. A wireless communication method, comprising:
   receiving a sequence generated by a convolutional modulation between a three-coefficient function having values $$\frac{\sqrt{2}}{2},$$

1, and $$\frac{\sqrt{2}}{2}$$

and an intermediate sequence, wherein the intermediate sequence is generated by inserting a zero coefficient between each adjacent pair of coefficients of an input sequence of coefficients that is generated by mapping data bits to constellation points according to a π/2-Binary Phase Shift Keying (BPSK) modulation scheme,
   wherein the convolutional modulation comprises a multi-path delay operation, and wherein the multi-path delay operation comprises:
   generating multiple delayed sequences based on the intermediate sequence using different delay values; and
   computing a weighted sum of the multiple delayed sequences using the three-coefficient function; and
   demodulating the received sequence to determine the input sequence.

7. The method of claim 6, wherein an additional zero coefficient is inserted before a first coefficient of the input sequence.

8. The method of claim 6, wherein generating the multiple delayed sequences includes a cyclic delay operation in which coefficients in the intermediate sequence are shifted in time domain in a circular manner or a linear delay operation in which coefficients in the intermediate sequence are shifted in time domain in a linear manner.

9. The method of claim 6, wherein the multi-path delay operation generates three delayed sequences, and wherein $$\frac{\sqrt{2}}{2},$$

1, and $$\frac{\sqrt{2}}{2}$$

are coefficients for the corresponding delayed sequences.

10. A wireless communication apparatus comprising a processor and a memory storing instructions, execution of which by the processor causes the apparatus to:
  determine, for an input sequence of coefficients that is generated by mapping data bits to constellation points according to a π/2-Binary Phase Shift Keying (BPSK) modulation scheme, an output sequence; and
  generate a waveform using the output sequence;
  wherein the output sequence corresponds to an output of a convolutional modulation between a three-coefficient function having values $$\frac{\sqrt{2}}{2},$$

1, and $$\frac{\sqrt{2}}{2}$$

and an intermediate sequence,
    wherein the intermediate sequence is generated by inserting a zero coefficient between each pair of adjacent coefficients of the input sequence,
    wherein the convolutional modulation comprises a multi-path delay operation, and wherein the multi-path delay operation comprises:
    generating multiple delayed sequences based on the intermediate sequence using different delay values; and
    computing a weighted sum of the multiple delayed sequences using the three-coefficient function.

11. The apparatus of claim 10, wherein an additional zero coefficient is inserted before a first coefficient of the input sequence.

12. The apparatus of claim 10, wherein generating the multiple delayed sequences includes a cyclic delay operation in which coefficients in the intermediate sequence are shifted in time domain in a circular manner or a linear delay operation in which coefficients in the intermediate sequence are shifted in time domain in a linear manner.

13. The apparatus of claim 10, wherein the multi-path delay operation generates three delayed sequences, and wherein $$\frac{\sqrt{2}}{2},$$

1, and $$\frac{\sqrt{2}}{2}$$

are coefficients for the corresponding delayed sequences.

14. A wireless communication apparatus comprising a processor and a memory storing instructions, execution of which by the processor causes the apparatus to:
  receive a sequence generated by a convolutional modulation between a three-coefficient function having values $$\frac{\sqrt{2}}{2},$$

1, and $$\frac{\sqrt{2}}{2}$$

and an intermediate sequence, wherein the intermediate sequence is generated by inserting a zero coefficient between each adjacent pair of coefficients of an input sequence of coefficients that is generated by mapping data bits to constellation points according to a π/2-Binary Phase Shift Keying (BPSK) modulation scheme,
    wherein the convolutional modulation comprises a multi-path delay operation, and wherein the multi-path delay operation comprises:
    generating multiple delayed sequences based on the intermediate sequence using different delay values; and
    computing a weighted sum of the multiple delayed sequences using the three-coefficient function; and
    demodulate the received sequence to determine the input sequence.

15. The apparatus of claim 14, wherein an additional zero coefficient is inserted before a first coefficient of the input sequence.

16. The apparatus of claim 14, wherein generating the multiple delayed sequences includes a cyclic delay operation in which coefficients in the intermediate sequence are shifted in time domain in a circular manner or a linear delay operation in which coefficients in the intermediate sequence are shifted in time domain in a linear manner.

17. The apparatus of claim 14, wherein the multi-path delay operation generates three delayed sequences, and wherein $$\frac{\sqrt{2}}{2},$$

1, and $$\frac{\sqrt{2}}{2}$$

are coefficients for the corresponding delayed sequences.

* * * * *